United States Patent
Kusari et al.

(10) Patent No.: US 10,703,370 B2
(45) Date of Patent: Jul. 7, 2020

(54) VEHICLE ACTION CONTROL

(71) Applicant: Ford Global Technologies, LLC, Dearborn, MI (US)

(72) Inventors: Arpan Kusari, East Lansing, MI (US); Hongtei Eric Tseng, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 2 days.

(21) Appl. No.: 16/111,504

(22) Filed: Aug. 24, 2018

(65) Prior Publication Data
US 2020/0062262 A1  Feb. 27, 2020

(51) Int. Cl.
| G05D 1/02 | (2020.01) |
| B60W 30/09 | (2012.01) |
| B60W 30/16 | (2020.01) |
| G08G 1/16 | (2006.01) |
| G05D 1/00 | (2006.01) |
| B60W 30/095 | (2012.01) |
| B60W 30/18 | (2012.01) |

(52) U.S. Cl.
CPC ..... B60W 30/18163 (2013.01); G05D 1/0217 (2013.01); G05D 1/0221 (2013.01); G05D 1/0223 (2013.01); B60W 30/09 (2013.01); B60W 30/0956 (2013.01); B60W 30/16 (2013.01); B60W 2420/42 (2013.01); B60W 2420/52 (2013.01); G05D 1/0088 (2013.01); G05D 1/0214 (2013.01); G08G 1/167 (2013.01)

(58) Field of Classification Search
CPC ........ B60W 30/18163; B60W 30/0956; G05D 1/0088; G05D 1/0221; G05D 1/0217
See application file for complete search history.

(56) References Cited

U.S. PATENT DOCUMENTS

| 9,346,167 | B2 | 5/2016 | O'Connor et al. |
| 9,977,430 | B2 | 5/2018 | Shalev-Shwartz et al. |
| 2018/0011488 | A1 | 1/2018 | Nishi |
| 2018/0032082 | A1* | 2/2018 | Shalev-Shwartz .......... G01C 21/3453 |
| 2019/0220016 | A1* | 7/2019 | Phillips ............. B60W 30/0953 |
| 2019/0266489 | A1* | 8/2019 | Hu ........................ B60W 50/00 |
| 2019/0286157 | A1* | 9/2019 | Shalev-Shwartz .......... G05D 1/0214 |
| 2019/0291727 | A1* | 9/2019 | Shalev-Shwartz .......... B60W 30/0956 |
| 2019/0369637 | A1* | 12/2019 | Shalev-Shwartz .......... G05D 1/0214 |

FOREIGN PATENT DOCUMENTS

| CN | 102799179 B1 | 12/2014 |
| CN | 107065890 A | 8/2017 |
| WO | 2018071392 A1 | 4/2018 |

OTHER PUBLICATIONS

Chen et al., "DeepDriving: Learning Affordance for Direct Perception in Autonomous Driving", Princeton University; http://deepdriving.cs.princeton.edu, Proceedings of 15th IEEE International Conference on Computer Vision (ICCV2015).

* cited by examiner

Primary Examiner — Alan D Hutchinson
Assistant Examiner — Andy Schneider
(74) Attorney, Agent, or Firm — Frank A. MacKenzie; Bejin Bieneman PLC

(57) ABSTRACT

One or more target areas are identified proximate to a moving vehicle. The vehicle can be maneuvered to a target area selected according to a reinforcement learning reward function.

18 Claims, 4 Drawing Sheets

VEHICLE ACTION CONTROL

BACKGROUND

Autonomous or self-driving vehicles can navigate a vehicle from an origin to a destination without input from a human operator. However, if the autonomous vehicle is simply programmed to move from an origin to a destination, the vehicle likely will not proceed as efficiently as possible. For example, a vehicle traveling in a lane of traffic with slower-moving vehicles could reach a destination later than the vehicle would if it were able to maneuver to optimize speed in addition to simply navigating from the origin to the destination.

DETAILED DESCRIPTION

A computer comprises a processor and a memory, the memory storing instructions executable by the processor to identify one or more target areas proximate to a moving vehicle; and maneuver the vehicle to a target area selected according to a reinforcement learning reward function. The reward function can be developed to optimize vehicle speed. The reward function can include a penalty for safety risk. The reward function can evaluate a relative velocity of a second vehicle to specify a reward. The reward function can evaluate a length of a target area. The one or more target areas can be specified according to a maximum longitudinal distance on a roadway. The one or more target areas can be specified according to a boundary of at least one second vehicle. The one or more target areas include target areas in a plurality of lanes on a roadway. The instructions can further include instructions to determine that the moving vehicle is moving above a predetermined velocity threshold prior to selecting the target area.

A method comprises identifying one or more target areas proximate to a moving vehicle; and maneuvering the vehicle to a target area selected according to a reinforcement learning reward function. The reward function can be developed to optimize vehicle speed. The reward function can include a penalty for safety risk. The reward function can evaluate a relative velocity of a second vehicle to specify a reward. The reward function can evaluate a length of a target area. The one or more target areas can be specified according to a maximum longitudinal distance on a roadway. The one or more target areas can be specified according to a boundary of at least one second vehicle. The one or more target areas include target areas in a plurality of lanes on a roadway. The method can further include determining that the moving vehicle is moving above a predetermined velocity threshold prior to selecting the target area.

A vehicle comprises a sensor providing data about an area around the vehicle; and a computer comprising a processor and a memory, the memory storing instructions executable by the processor to, based on data from the sensor, identify one or more target areas proximate to a moving vehicle; and maneuver the vehicle to a target area selected according to a reinforcement learning reward function. The one or more target areas include target areas in a plurality of lanes on a roadway.

Figure 1:
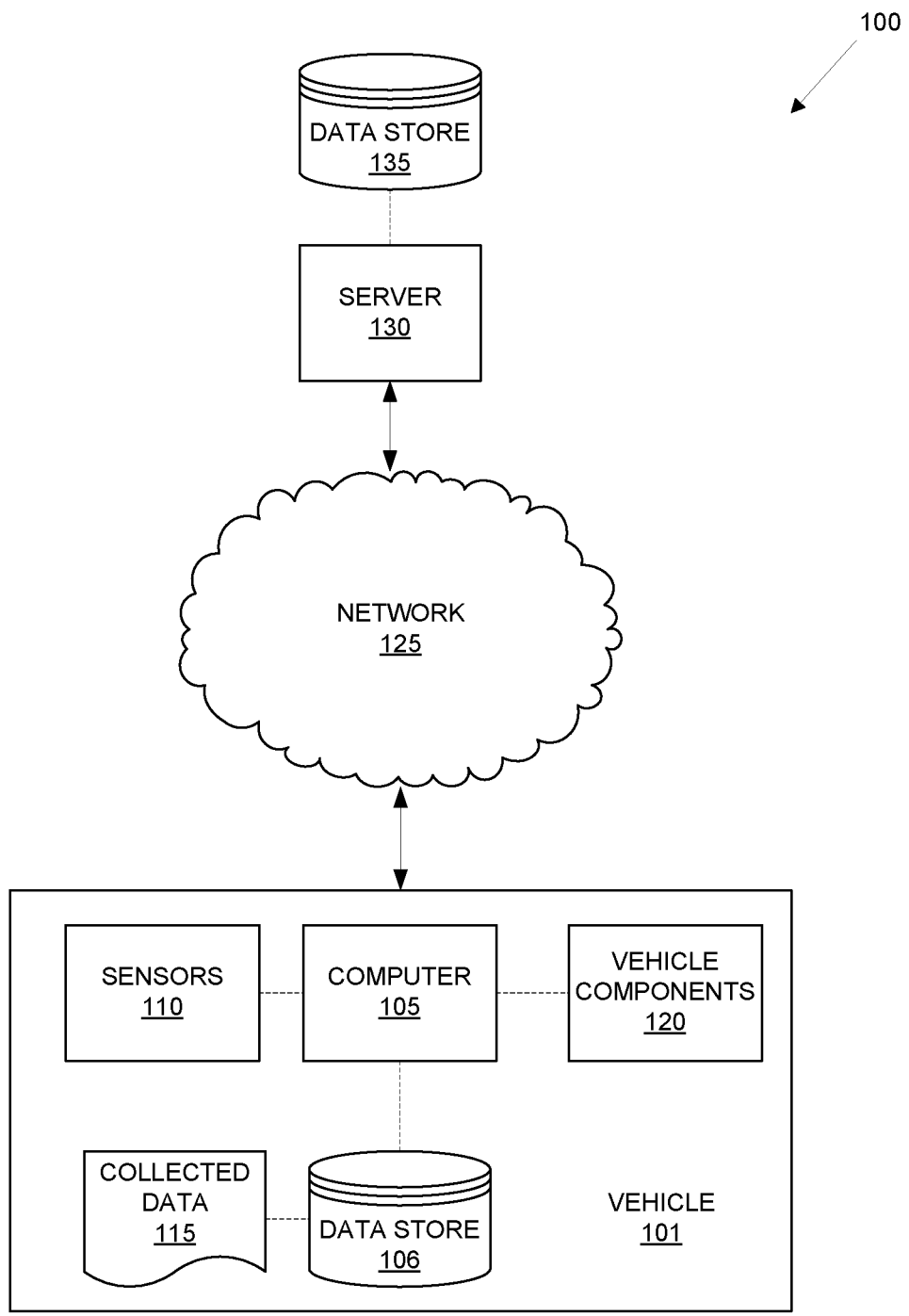
FIG. 1 illustrates an exemplary system for controlling an action of a vehicle.
Figure 2:
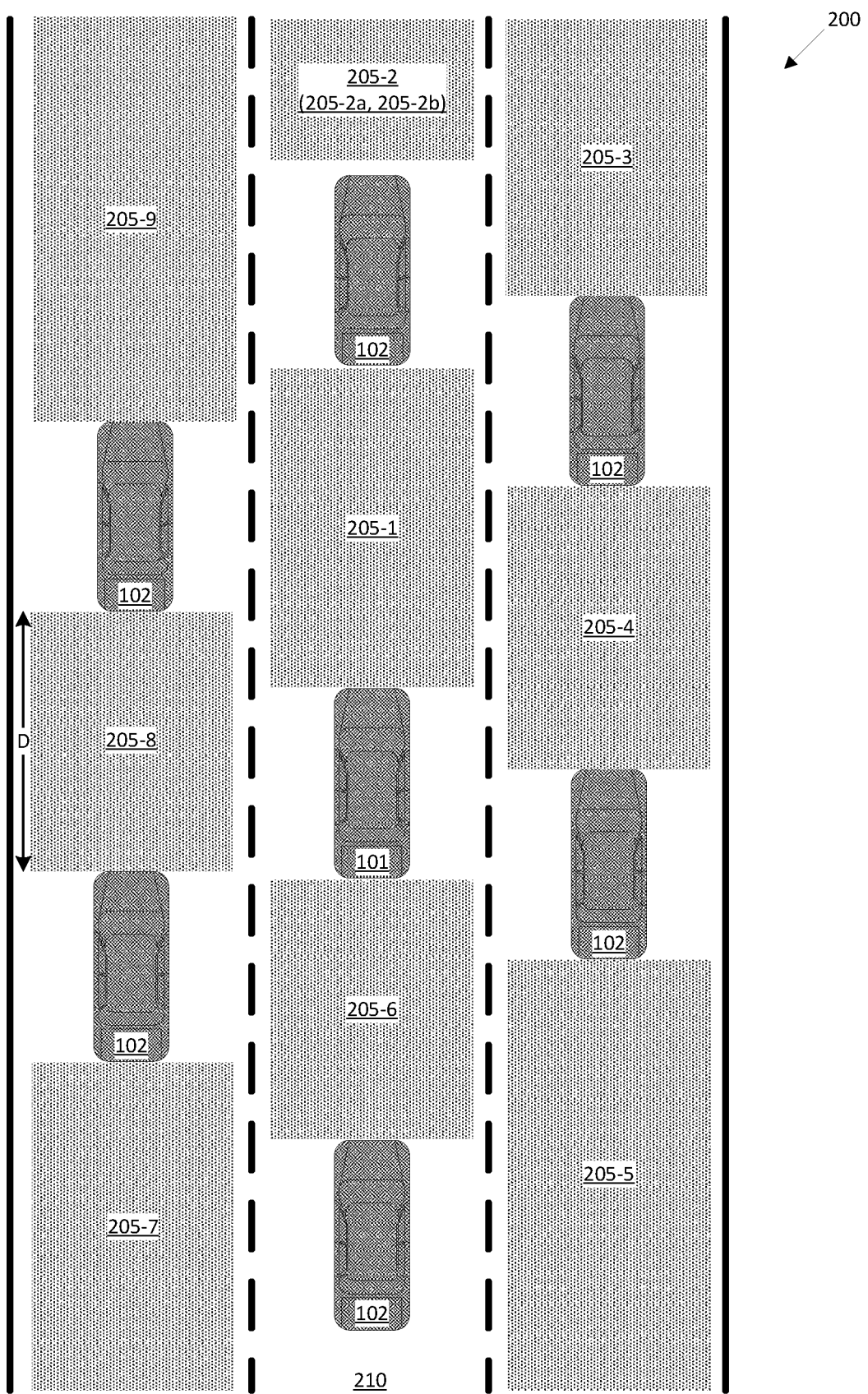
FIG. 2 illustrates an exemplary traffic scene in which the system of FIG. 1 can be practiced.

FIG. 1 illustrates an example system 100 for controlling an action of a vehicle 101. With reference to FIGS. 1 and 2, a computer 105 in an ego or host vehicle 101 can be programmed for selecting one of a plurality of target areas 205 around the vehicle 101 as a target or goal for vehicle 101 navigation. An target area 205 is a discrete space around the vehicle 101 defined by a longitudinal gap or space on a roadway 210 between the host vehicle 101 and a non-ego vehicle 102 (when the non-ego vehicle 102 is in a same lane of the roadway 210 as the ego vehicle 102) or between first and second non-ego vehicles 102 (i.e., in a lane not currently occupied by the ego vehicle 101). Selection of a target area 205 for ego vehicle 101 navigation can be determined by a deep reinforcement learning program trained with a reward function to optimize selection of a target area 205. Training the deep reinforcement learning program to optimize selection of discrete target areas 205 is advantageous because narrowing possible updates to a vehicle 101 path polynomial to a specified target area 205 can reduce computational overhead in a vehicle computer 105, and because reinforcement learning is generally more robust and reliable when trained for discrete action spaces such as discrete target areas 205.

The vehicle 101 is a powered land vehicle having two or more wheels. When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data. Collected data 115, such as illustrated in Table 1 below, typically describes operation of the vehicle 101. That is, collected data 115 typically describes a characteristic or attribute of the vehicle 101 and/or a component 120 thereof while the vehicle 101 is moving on a roadway, has an ignition status of ON, etc.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, and the like.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc., local area networks (LAN) and/or wide area networks (WAN), including the Internet, providing data communication services.

FIG. 2 illustrates a traffic scene 200 including an ego vehicle 101 and non-ego vehicles 102 on a roadway 210. Various target areas or gaps 205 are defined between vehicles 101, 102 as explained above. Each of the target areas 205 is proximate to the vehicle 101. "Proximate" in this context means that at least a portion of the target area 205 is in a same lane or an adjacent lane to a lane of travel of the vehicle 101 and within a maximum specified longitudinal distance of the vehicle 101, i.e., a distance along a direction of travel of a roadway 210. The maximum specified longitudinal distance can be a multiple, e.g., 2, 2.5, 3, etc., of the maximum specified value for the longitudinal distance D discussed below. The target areas are individually numbered 205-1 through 205-9, and are collectively referred to herein as target areas 205. The target area 205-2 is denoted as 205-2a and 205-2b because the same physical area 205-2 can logically (and for purposes of reinforcement learning as described herein) be two distinct areas 205-2a, 205-2b, depending on whether an ego vehicle 101 reaches the area 205-2 by going around the forward vehicle 102 to the right or the left. The illustrated traffic scene 200 includes a roadway 210 having three lanes of travel in a same direction, with the ego vehicle 101 in a center lane, i.e., having lanes of travel immediately to the left and to the right of its own current lane of travel.

Each target area 205 is defined by a length, i.e., distance D, i.e., a distance in a direction of travel on a roadway 210 between front and rear, or leading and trailing, edges or sides of the area 210. In FIG. 2, the distance D is illustrated with respect to the area 205-8 but not for other areas 205 for ease and clarity of illustration. The distance D can be determined according to a distance from, e.g., a front bumper of a first vehicle 101, 102 to, e.g., a rear bumper of a second vehicle 101, 102, e.g., according to a length of a line from points on respective front and rear bumpers of vehicles 101, 102. Thus, a side or edge of an area 205 can be defined by a line that is tangent to a forward or rearward most point on a vehicle 101, 102 (or through a plurality of lines that are most forward or rear on a vehicle 101, 102). Vehicle sensors 110 can provide data 115, e.g., lidar, radar, ultrasound, images, etc., according to conventional techniques to determine relative positions of vehicles 102, and hence respective distances D.

The target areas 205 are typically defined for each of the three or more possible lanes of interest, by identifying non-ego vehicles 102 in each respective lane within a specified longitudinal distance (i.e., distance of travel along the roadway 210) of the ego vehicle 101. However, if zero vehicles 102 or only one vehicle 102 are present in a lane, then only one or two, respectively, target areas 205 will be defined. Put another, way, the distance D can have a maximum specified value; that is, if a distance between vehicles 102 (or between vehicles 101, 102) is greater than the maximum specified value for D, then a target area 205 cannot be specified between the vehicles 102 (or vehicle 101, 102). Then the two longitudinally closest vehicles in each lane are selected to define the respective targets areas 205. For example, if no vehicles 102 were present in the lane to the left of the ego vehicle 101 in FIG. 2 (i.e., were within the specified longitudinal distance, i.e., maximum specified value for D), then only one target area 205 would be defined for that lane. The maximum specified value for D may vary, e.g., increase, as a function of vehicle speed, and/or can be determined according to a maximum scanning or detection range of vehicle 105 sensors, e.g., D could be a maximum distance determined by a vehicle 105 and/or sensor 110 manufacturer, for example. In a simplest example the ego vehicle 101 may be traveling on a road 210 with one lane in a direction with one other vehicle 102 within a specified distance, in which case the vehicle 101 could select from two possible target areas 205.

Note that FIG. 2 thus represents a most complex traffic scene 200, and that simpler arrangements are possible. For example, a roadway 210 could provide one or two lanes in a direction of travel of the ego vehicle 101. Moreover, even if the roadway 210 includes three or more lanes of travel in a same direction, the ego vehicle 101 could be in an edge lane, i.e., a lane having a road shoulder or boundary to the right or left. If the ego vehicle 101 is in an edge lane of a roadway 210, then target areas 205 can exist only in the current lane of the ego vehicle 101 and a lane to the left or right of the current lane of the ego vehicle 101. Accordingly, fewer non-ego vehicles 102 could be present than illustrated in FIG. 2. Again, the most complex possible scenario, that including eight possible target areas 205, has been illustrated.

Deep Learning Determination

Reinforcement learning is a sequential decision making process for an agent with states $S_t$ and actions $A_t$, and scalar rewards R for each step t. For a state-action pair $(S_t, A_t)$, reinforcement learning applies the reward R for a resulting state $S_{t+1}$, i.e., a state resulting from the action $A_t$ taken from (or while in) the state $S_t$. A policy π determines the action $A_t$ to move from a state $S_t$ to a state $S_{t+1}$. Deep reinforcement learning applies reinforcement learning in a deep neural network (DNN), i.e., the DNN provides the agent to determine rewards for state-action pairs.

Referring again to FIG. 2, each state $S_t$ can, in the present example, be described by a set that specifies, for a target area 205, a distance D between front and rear vehicles 102 (or, in the case of the area 205-1 in FIG. 2, a distance between the vehicle 101 and a forward vehicle 102), and relative velocities, of the front and rear vehicles 102 (or vehicles 101, 102) for the target area 205. In this disclosure, a convention is adopted whereby a relative velocity is negative if vehicles 101, 102 are moving closer together (i.e., the distance D for a respective area 205 is growing smaller), and positive if vehicles 101, 102 are moving further apart from one another (i.e., the distance D for a respective area 205 is growing larger).

Continuing with this example, an initial state $S_0$ of the ego vehicle 101 can include the distance D for the target area 205-1, a relative velocity of the vehicle 101 with respect to itself, i.e., zero or no relative velocity, and a relative velocity of an immediately preceding vehicle 102, i.e., the vehicle 102 defining the front or leading edge of the target area 205-1.

Each action $A_t$ specifies moving the ego vehicle 101 to or in a target area 205, i.e., to a respective one of a plurality of target areas 205-1, 205-2, . . . , 205-n (e.g., in FIG. 2 n=9), i.e., an area 205 to which the vehicle 101 can move at a time t+1. In a state $S_{t+1}$, the vehicle location will be one of the target areas 205-1, 205-2, . . . , 205-n, and the state will include relative velocities and distances D for a new set of target areas 205-1, 205-2, . . . , 205-n defined with respect to the vehicle 101. Thus, for the initial state $S_0$ described above, possible actions Ao are respective movements of the vehicle 101 to the respective target areas 205-1, 205-2, . . . , 205-9.

The reward R can be determined according to one or more criteria. In an example, the reward R could be a function to optimize (e.g., maximize) a speed of the ego vehicle 101. An additional criterion could include maximizing vehicle 101 occupant comfort. For example occupant comfort may be optimized by discouraging lane changes, because some occupants may find lane changes uncomfortable. Thus, a reward function could include an enhancement for an action that did not include a lane change, and/or a penalty for an action that did include a lane change. A possible example reward function could be:

$$R = w_1 \Delta v + w_2 T_{area} - w_3 * P_t$$

where $w_1$, $w_2$, and $w_3$ are weights, e.g., 0.01, 0.01, and 0.1, respectively; Δv is a difference between a current speed and a speed that would result from taking an action A (possibly subject to a legal speed limit); $T_{area}$ is an amount of time, sometimes referred to as "time alive," that the vehicle 105 has operated without collision in a simulation episode (as defined below), and, to discourage lane-changing, P is a penalty assessed if a lane change results from the action A.

Alternatively or additionally, in further examples a reward function to optimize speed could also include factors to optimize safety, e.g., penalties if a state $S_t$ results in safety risk, e.g., a vehicle 101 being in a collision, exceeding a posted speed limit, and/or less than a safe distance from a vehicle 102 (e.g., a table or the like could specify a safe longitudinal separation distance for a vehicle 101 from a vehicle 102, and the penalty could be included if a state $S_t$ resulted in a separation distance less than specified in the table.

Figure 3:
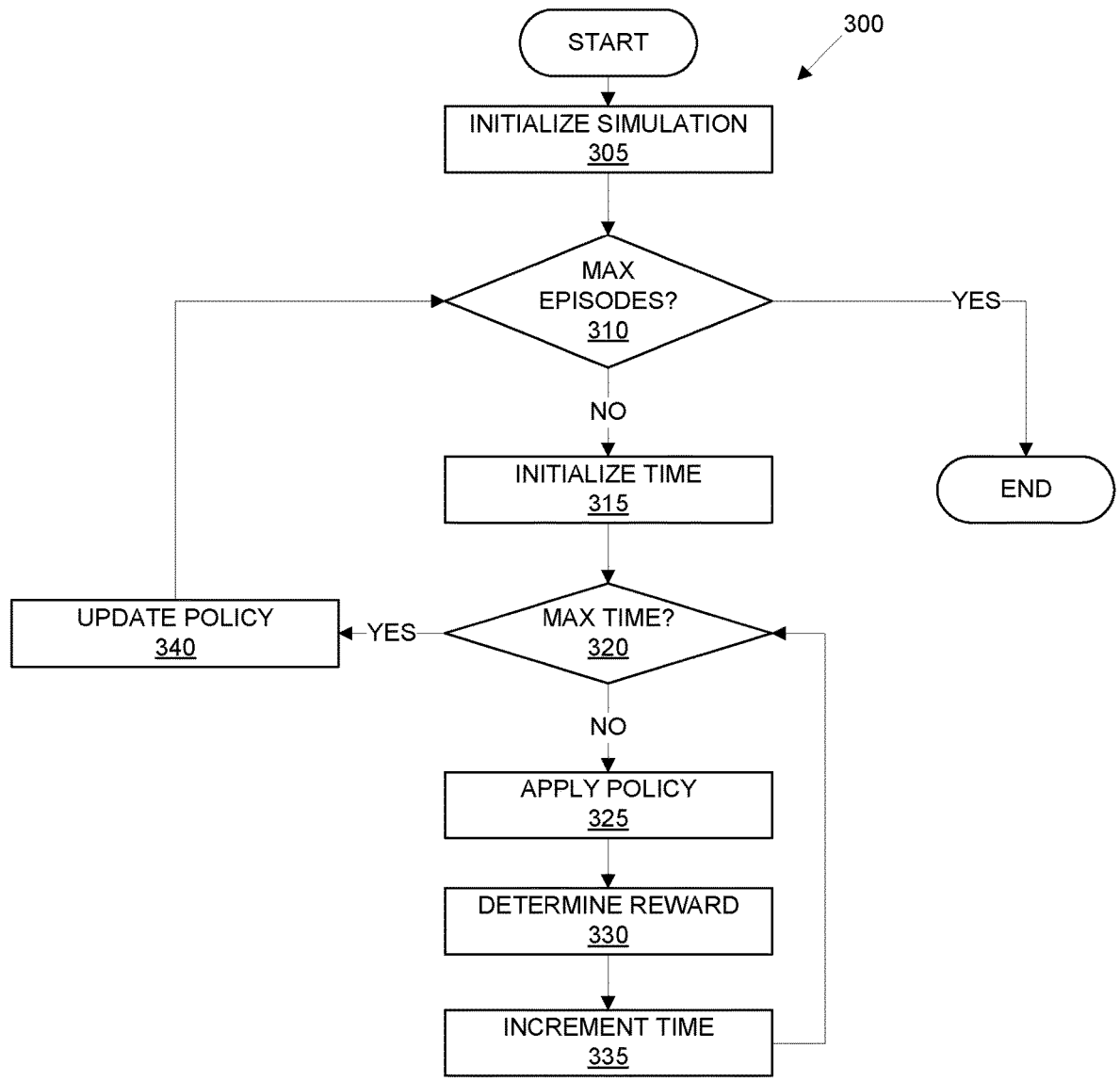
FIG. 3 illustrates an exemplary process for developing a reward function for reinforcement learning training.

FIG. 3 illustrates an exemplary process 300 for reinforcement learning training to develop a reward function for selecting a target area 205 for a vehicle 101. The process 300 can be executed by a general purpose computer programmed to simulate operation of a vehicle 101, and to perform reinforcement learning as described herein. For example, the Unreal Engine from Epic Games Inc., of Cary, N.C., the Simulation of Urban MObility (SUMO) package from the Institute of Transportation Systems of Berlin, Germany, or any other suitable simulation software can be used.

The process 300 begins in a block 305 in which a simulation is initialized. The simulation can include a traffic scene such as the traffic scene 200 illustrated in FIG. 2. The simulation places the vehicle 101 in the traffic scene with one or more other vehicles 102. As explained above, a traffic scene can include one or more lanes in a direction of travel of the vehicle 101; the simulation can likewise be varied to include various numbers of lanes of travel and/or various numbers of other vehicles 102. Further, the simulation can specify various initial speeds of travel of the vehicle 101. Typically, reinforcement learning training of a reward function to select a target area 205 is not performed below a minimum vehicle 101 speed, e.g., 20 kilometers per hour.

Initializing the simulation includes initializing the policy π that specifies a rule for selecting the next state $S_{t+1}$. Initializing the simulation further includes initializing an episode. An episode is a specified number of time steps for which a simulation is run after which the policy π is updated. Moreover, initializing the simulation can include specifying a number of episodes to be run in the simulation, and setting an episode counter to zero.

In the present example, the policy π is initialized randomly (and then updated as discussed further below) according to an epsilon-greedy algorithm, a form of exploration-exploitation technique which works to maximize rewards in states that have been visited, while continuing to search for unknown states. Accordingly, a policy π according to an epsilon-greedy algorithm selects a random action if a random value chosen is lesser than epsilon and otherwise, chooses the action that gives the maximum reward at the state resulting from the action. The value for epsilon starts with a value close to 1 and decreases during an episode to approach or reach a minimum value.

Next, in a block 310, reinforcement learning programming in a computer such as mentioned above determines whether the episodes counter has reached a specified maximum number of episodes. If so, the process 300 ends. Otherwise, the process 300 proceeds to a block 315.

In the block 315, a time step counter for a current episode is initialized, e.g., set to zero.

Then, in a block 320, reinforcement learning programming determines whether the time step counter has reached a specified maximum time step. If so, then the process 300 proceeds to a block 340; otherwise, the process 300 proceeds to a block 325.

In the block 325, reinforcement learning programming applies the policy π initialized in the block 305 to select an action $A_t$ to transition from a current state $S_t$ to a next state $S_{t+1}$. As explained above, possible actions $A_t$ can include actions to move the vehicle 101 according to distances D and relative velocities of vehicles 101, 102 of respective available target areas 205, i.e., according to respective possible next states $S_{t+1}$.

Next, in a block 330, a reward resulting from application of the policy in the block 325 is determined. To determine the reward, a vehicle 105 trajectory $Traj_{t+1}$ for a next time step is determined. For example, the simulator could simulate operations of a vehicle controller (e.g., a vehicle 105 virtual driver or programming to operate the vehicle 105), that, once a target area 205 is selected for the vehicle 105, determines the trajectory $Traj_{t+1}$, which includes a heading and velocity (or speed) of the vehicle 105 in the next state $S_{t+1}$, i.e., when the vehicle 105 is occupying the target area 205 selected in the block 310.

The reward R resulting from the state $S_{t+1}$, can then be computed, i.e., according to the trajectory $Traj_{t+1}$ in a selected target area 205, compared to a trajectory $Traj_t$ in the state $S_t$. For example, as explained above, a reward function could be designed to optimize vehicle 101 speed. Therefore, the reward function could specify a higher reward in proportion to increase in vehicle 101 speed, or a negative reward if vehicle 101 speed is decreased in a state $S_{t+1}$. Further, the reward function could impose penalties for various values in a state $S_{t+1}$. For example, a reward could be zero or negative if a state $S_{t+1}$ included a distance D below a threshold predetermined, at a current vehicle 101 speed, to result in a collision or unacceptable risk thereof. Further, for time steps further in the future, i.e., as the time t increases, the reward may be discounted. That is, the reinforcement learning programming may be designed to more heavily emphasize rewards for actions that achieve short-term or quick benefits, i.e., more quickly optimize vehicle 101 speed, as opposed to actions whose benefits are likely to be more long-term.

Next, in a block 335, the current time step is incremented, and the process 300 returns to the block 320.

In the block 340, programming is executed to update the policy π. For example, programming herein may be executed according to what is known as a REINFORCE algorithm. As an example, the REINFORCE algorithm can update policy parameters (here, a state $S_t$ that specified an area 205 including the distance D and relative velocity, and an action $A_t$ to select the area 205) as follows. First, for the n time steps executed in the above loop (blocks 320-325), compute a reward sum RS:

$$RS = \sum_{i=0}^{n} [\text{sum of reward } R \text{ for each step} \geq i]$$

Then determine a gradient G for the rewards R obtained by policy π in successive time steps t. Then update a policy parameter vector θ (i.e., including state-actions pairs) according to:

log G*RS.

The updated policy π is thus designed to allow the reward R to be more efficiently optimized in subsequent simulation runs, e.g., execution of the blocks 310-330.

Figure 4:
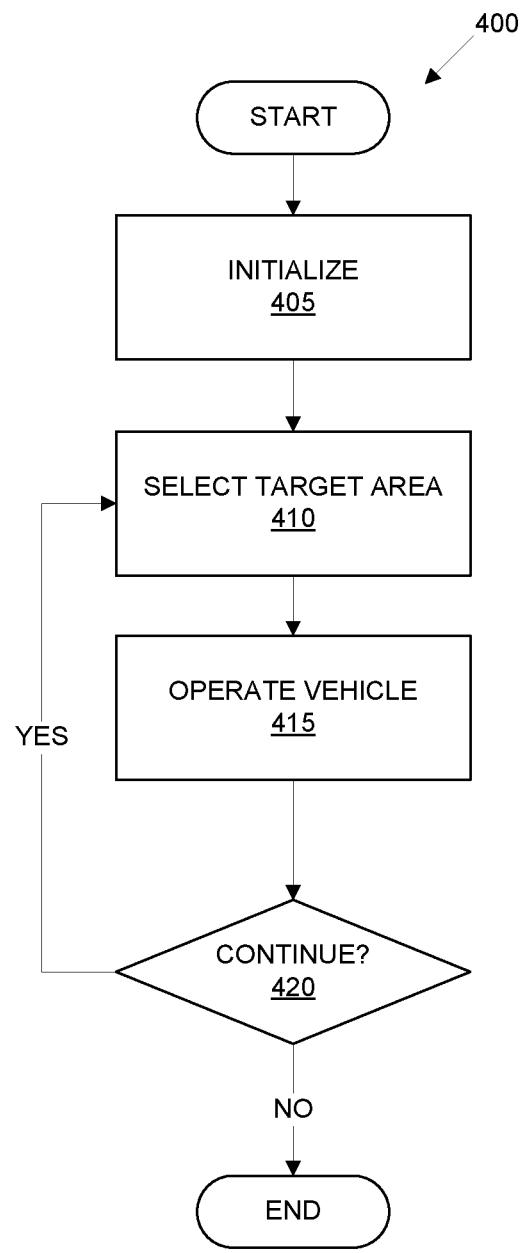
FIG. 4 illustrates an exemplary process for operating a vehicle according to the reward function.

FIG. 4 illustrates an exemplary process 400 for operating a vehicle according to the reward function. The process 400 may be executed by programming in a vehicle 101 computer 105 that has been programmed to use a reward function such as developed in the process 300 to select and move the vehicle 101 to a target area 205.

The process 400 begins in a block 405, in which the computer 105 initializes the process 400. For example, the computer 105 may be programmed to initialize or initiate the process 400 upon determining that the vehicle 101 is traveling at or greater than a predetermined speed, e.g., 20 kilometers per hour. The reason for this is that, at lower speeds, vehicles 101, 102 are unlikely to be moving at speeds that are consistent enough to maintain areas 205 for selection.

Next, in a block 410, the computer 105 identifies and selects a target area 205. For example, target areas 205 could be identified based on sensor 110 data 115 as explained above. A target area 205 to which the vehicle 101 is to be moved can then be selected according to a reward function such as developed according to the process 300.

Next, in a block 415, the computer 105 actuates vehicle 101 components 120, e.g., propulsion, brakes, steering, etc., to move the vehicle 101 to the selected target area 105.

Next, in a block 420, the computer 105 determines whether the process 400 is to continue. For example, vehicle 101 speed could fall below a predetermined threshold as described above, the vehicle 101 could be stopped or powered off, etc. If the process 400 is not to continue, then the process 400 ends. Otherwise, the process 400 returns to the block 410.

CONCLUSION

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A computer comprising a processor and a memory, the memory storing instructions executable by the processor to:
   identify one or more target areas proximate to a moving vehicle; and
   maneuver the moving vehicle to a target area selected according to a reinforcement learning reward function;
   wherein the reward function includes a difference between a current speed and a speed that would result from taking an action affecting movement of the moving vehicle, an amount of time that the moving vehicle has operated without collision in a simulation episode, and a penalty assessed if a lane change results from the action.

2. The computer of claim 1, wherein the reward function includes a penalty for a safety risk.

3. The computer of claim 1, wherein the reward function evaluates a relative velocity of a second vehicle to specify a reward.

4. The computer of claim 1, wherein the reward function evaluates a length of the target area to specify a reward.

5. The computer of claim 1, wherein the one or more target areas are specified according to a maximum longitudinal distance between vehicles on a roadway.

6. The computer of claim 1, wherein the one or more target areas are specified according to a boundary of at least one second vehicle.

7. The computer of claim 1, wherein the one or more target areas include target areas in a plurality of lanes on a roadway.

8. The computer of claim 1, wherein the instructions further include instructions to determine that the moving vehicle is moving above a predetermined velocity threshold prior to selecting the target area.

9. A method, comprising:
   identifying one or more target areas proximate to a moving vehicle; and
   maneuvering the moving vehicle to a target area selected according to a reinforcement learning reward function;
   wherein the reward function includes a difference between a current speed and a speed that would result from taking an action affecting movement of the moving vehicle, an amount of time that the moving vehicle has operated without collision in a simulation episode, and a penalty assessed if a lane change results from the action.

10. The method of claim 9, wherein the reward function includes a penalty for a safety risk.

11. The method of claim 9, wherein the reward function evaluates a relative velocity of a second vehicle to specify a reward.

12. The method of claim 9, wherein the reward function evaluates a length of the target area to specify a reward.

13. The method of claim 9, wherein the one or more target areas are specified according to a maximum longitudinal distance between vehicles on a roadway.

14. The method of claim 9, wherein the one or more target areas are specified according to a boundary of at least one second vehicle.

15. The method of claim 9, wherein the one or more target areas include target areas in a plurality of lanes on a roadway.

16. The method of claim 9, further comprising determining that the moving vehicle is moving above a predetermined velocity threshold prior to selecting the target area.

17. A vehicle, comprising:
   a sensor providing data about an area around the vehicle; and
   a computer comprising a processor and a memory, the memory storing instructions executable by the processor to:
      based on data from the sensor, identify one or more target areas proximate to a moving vehicle; and
      maneuver the vehicle to a target area selected according to a reinforcement learning reward function;
      wherein the reward function includes a difference between a current speed and a speed that would result from taking an action affecting movement of the moving vehicle, an amount of time that the moving vehicle has operated without collision in a simulation episode, and a penalty assessed if a lane change results from the action.

18. The vehicle of claim 17, wherein the one or more target areas include target areas in a plurality of lanes on a roadway.

* * * * *